United States Patent Office — 3,154,590 — Patented Oct. 27, 1964

3,154,590
TETRA (BETA-HYDROXYETHYL) METHANE
Leonard M. Rice, Baltimore, Md., and Charles H. Grogan, Falls Church, Va., assignors to The Geschickter Fund for Medical Research, Washington, D.C., a corporation of New York
No Drawing. Filed Aug. 5, 1960, Ser. No. 47,592
1 Claim. (Cl. 260—635)

This invention relates to a novel composition of matter and the method of preparation and use thereof. More specifically this invention relates to tetra (beta-hydroxyethyl) methane having the following formula:

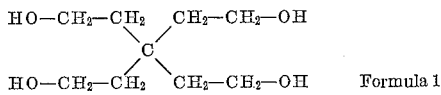

Formula 1

It has been found that tetra (beta-hydroxyethyl) methane having the foregoing formula is particularly useful as a synthetic intermediate, as for example, as a starting material for the preparation of 3,9-diazaspiro (5:5) undecanes having the following formula:

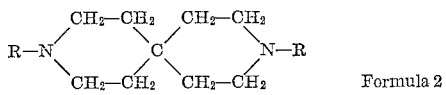

Formula 2 wherein R is selected from the group consisting of hydrogen and alkyl and alkylene groups of 1 to 6 carbon atoms.

These 3,9-diazaspiro (5:5) undecanes are prepared by reaction of the polyol with ammonia and/or amines under suitable pressure and temperature as set out more specifically in copending application Serial No. 47,613, filed concurrently herewith.

The alcohol itself possesses physiological properties, being a mild stimulant and having a very low toxicity. In addition the alcohol can be copolymerized with anhydrides.

It is accordingly a primary object of the present invention to provide a new composition of matter and a method of its preparation.

It is another object of the invention to provide tetra (beta-hydroxyethyl) methane having the following formula:

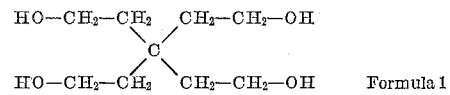

Formula 1

It is another object of the invention to provide a novel process of producing tetra (beta-hydroxyethyl) methane having the following formula:

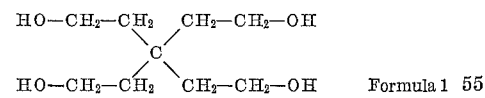

Formula 1

These and further objects and advantages of the invention will become more apparent by a specific description of the preparation of the novel composition by the novel process.

Twenty-five grams of methane tetraacetic acid tetra ethyl ester, dissolved in anhydrous ether, were added dropwise over a period of ½ hour to 30 gm. of lithium aluminum hydride dissolved in 1,200 ml. of absolute ether. The reaction was carried out in a 2 liter vessel fitted with stirrer, reflux condenser, dropping funnel and a drying tube to protect from atmospheric moisture. After stirring the reaction mixture for 2 hours, it was decomposed by slow drop-wise addition of water until hydrogen ceased to be evolved. The mixture was stirred an additional two hours, filtered, and the ether extract dried over anhydrous sodium sulfate. On stripping off the ether very little of the polyol was found as a residue as it is little soluble in ether. The inorganic salt residue was extracted in an extractor with anhydrous ethanol. When the ethanol was concentrated nearly to dryness, the product solidified. It was washed with cold alcohol-ether and then with absolute ether and dried in vacuo. The crude yield was 85% of the polyol, tetraethanol methane or tetra (beta-hydroxyethyl) methane. The product was dissolved in absolute methanol, ether added to turbidity, and refrigerated. The tetraethanol methane separated as crystals, M.P. 103°. When recrystallized from methanol-ether it again melted at 103° and gave the following analysis:

|          | Percent Calc'd | Percent Found |
|----------|----------------|---------------|
| Carbon   | 56.22          | 56.46         |
| Hydrogen | 10.49          | 10.57         |
| Oxygen   | 33.29          | 33.56         |

The specific compounds and methods disclosed herein are to be considered in all respects as illustrative and not restrictive, the scope of the invention being indicated by the appended claim rather than the foregoing description, and all specific compounds and methods which come within the meaning and range of equivalency of the claim are intended to be embraced therein.

What is claimed and desired to be secured by United States Letters Patent is:

Tetra (beta-hydroxyethyl) methane having the following formula:

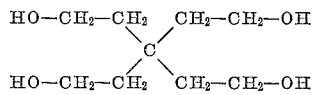

References Cited in the file of this patent
UNITED STATES PATENTS
2,763,679    Dee _____ Sept. 18, 1956